US009957035B2

(12) United States Patent
Valasek et al.

(10) Patent No.: US 9,957,035 B2
(45) Date of Patent: May 1, 2018

(54) UN-MANNED AERIAL VEHICLE HAVING ADJUSTABLE WING MODULE, TAIL, AND LANDING GEAR (71) Applicant: Texas A&M University System, College Station, TX (US)

(72) Inventors: John Valasek, College Station, TX (US); James Franklin May, College Station, TX (US); Andrew Beckett, Playa Vista, CA (US); Cecil C. Rhodes, Jr., Bryan, TX (US)

(73) Assignee: The Texas A&M University System, College Station, TX (US)

( * ) Notice: Subject to any disclaimer, the term of this patent is extended or adjusted under 35 U.S.C. 154(b) by 439 days.

(21) Appl. No.: 14/172,035

(22) Filed: Feb. 4, 2014

(65) Prior Publication Data
US 2016/0009363 A1 Jan. 14, 2016

Related U.S. Application Data (60) Provisional application No. 61/760,292, filed on Feb. 4, 2013.

(51) Int. Cl.
*B64C 1/26* (2006.01)
*B64C 1/22* (2006.01)
(Continued)

(52) U.S. Cl.
CPC .................. *B64C 1/26* (2013.01); *B64C 1/22* (2013.01); *B64C 39/024* (2013.01); *B64C 39/04* (2013.01);
(Continued)

(58) Field of Classification Search
CPC ............. B64C 2211/00; B64C 2203/00; B64C 2201/021; B64C 2201/102;
(Continued)

(56) References Cited

U.S. PATENT DOCUMENTS 1,393,820 A * 10/1921 Osborne .................. B64C 3/56
244/49
1,718,617 A * 6/1929 Wagner ..................... B64C 3/56
244/49
(Continued)

OTHER PUBLICATIONS

Screenshot of First Taxi Test of Texas A&M Pegasus UAV, published Feb. 1, 2012; https:///www.youtube.com/watch?v=MZJ5HiQWO4w&feature=youtu.be, accessed Feb. 22, 2016.*

(Continued)

*Primary Examiner* — Tien Q Dinh
*Assistant Examiner* — Alexander V. Giczy
(74) *Attorney, Agent, or Firm* — Winstead PC (57) ABSTRACT The present invention relates to an aircraft. The aircraft includes a fuselage module for receiving a payload. The fuselage module includes a plurality of internal connections. The aircraft includes a wing module adjustably coupled to the fuselage module and a tail module coupled to the wing module. The wing module may be adjusted relative to the fuselage module to adjust a location of an aerodynamic center of the aircraft to maintain a pre-determined distance between the location of the aerodynamic center of the aircraft and the location of the center of gravity of the aircraft. A main landing gear may be adjusted relative to the fuselage module to adjust the location of the aerodynamic center of the aircraft to maintain a pre-determined distance between the location of the aerodynamic center of the aircraft and the location of the center of gravity of the aircraft.

15 Claims, 10 Drawing Sheets (51) Int. Cl.
*B64C 39/02* (2006.01)
*B64C 39/04* (2006.01)
(52) U.S. Cl.
CPC .. *B64C 2201/021* (2013.01); *B64C 2201/044* (2013.01); *B64C 2201/128* (2013.01); *B64C 2211/00* (2013.01)
(58) Field of Classification Search
CPC .......... B64C 2201/20; B64C 2201/201; B64C 25/08; B64C 17/00; B64C 3/56; B64C 3/38; B64C 39/04; B64C 37/00; B64C 1/26; B64C 1/22; B64C 39/024; A63H 27/001; A63H 27/007; A63H 27/02; A63H 27/06
See application file for complete search history.

(56) References Cited

U.S. PATENT DOCUMENTS

| | | | | |
|---|---|---|---|---|
| 1,792,779 | A * | 2/1931 | Tarr | A63H 27/005 244/46 |
| 2,472,947 | A * | 6/1949 | Hlobil | B64C 39/02 244/100 R |
| 2,580,176 | A * | 12/1951 | Johnson | B64C 5/06 244/87 |
| 3,081,053 | A * | 3/1963 | Jarrell | B64C 3/56 16/352 |
| 3,493,197 | A * | 2/1970 | Spearman | B64C 5/10 244/218 |
| 3,510,093 | A * | 5/1970 | Frankovich | A63H 27/02 244/104 R |
| 4,139,172 | A * | 2/1979 | Miller | B64C 3/38 244/45 R |
| 4,676,545 | A * | 6/1987 | Bonfilio | B62D 21/00 114/357 |
| 4,736,910 | A * | 4/1988 | O'Quinn | B64C 1/0009 244/118.2 |
| 5,423,706 | A * | 6/1995 | Chase | A63H 27/007 446/213 |
| 5,941,478 | A * | 8/1999 | Schmittle | B64C 1/00 244/120 |
| 6,082,665 | A * | 7/2000 | Spitzer | B60F 5/02 244/2 |
| 7,185,847 | B1 * | 3/2007 | Bouchard | F42B 10/12 244/3.28 |
| 7,699,261 | B2 * | 4/2010 | Colten | B64C 39/024 244/45 R |
| 2005/0250407 | A1 * | 11/2005 | Frontera Castaner | A63H 27/02 446/36 |
| 2005/0258310 | A1 * | 11/2005 | Bilyk | B63B 22/003 244/138 R |
| 2007/0152098 | A1 * | 7/2007 | Sheahan, Jr. | B64C 3/56 244/49 |
| 2008/0149758 | A1 * | 6/2008 | Colgren | B64C 9/02 244/13 |
| 2010/0282917 | A1 * | 11/2010 | O'Shea | B64C 39/024 244/218 |
| 2011/0036941 | A1 * | 2/2011 | Cazals | B64C 3/38 244/46 |
| 2011/0046821 | A1 * | 2/2011 | Grabowsky | B64C 3/56 701/3 |
| 2011/0065351 | A1 * | 3/2011 | Corsiglia | A63H 27/12 446/37 |
| 2011/0147521 | A1 * | 6/2011 | Delahaye | B64C 1/26 244/119 |
| 2014/0349542 | A1 * | 11/2014 | Li | A63H 27/02 446/61 |
| 2016/0272319 | A1 * | 9/2016 | Hodge | B64D 9/00 |

OTHER PUBLICATIONS

Valeriy A. Komarov, et al., "Conceptual Aircraft Design", Samara State Aerospace University, 2011; http://www.ssau.ru/files/education/uch_posob/Conceptual%20Aircraft%20Design-Komarov%20VA.pdf, accessed Sep. 30, 2016.*
Mohammad Sadraey, "Landing Gear Design" in "Aircraft Design: A Systems Engineering Approach", Wiley, Nov. 2012; available from http://faculty.dwc.edu/sadraey/Chapter%209.%20Landing%20Gear%20Design.pdf; accessed Oct. 1, 2016.*
David A. Caughey, Introduction to Aircraft Stability and Control Course Notes for M&AE 5070, Cornell University, 2011; https://courses.cit.cornell.edu/mae5070/Caughey_2011_04.pdf, accessed Sep. 30, 2016.*
RC Universe, "CG / Landing gear relationship", posted by user F86_SABRE on Jan. 25, 2010; http://www.rcuniverse.com/forum/aerodynamics-76/9445860-cg-landing-gear-relationship.html; accessed Mar. 8, 2017.*
George, Justin, et al., Pegasus, Public Presentation, Dec. 2007 (11 pages).
George, Justin, et al., Design of an Advanced Control Law and Sensors Concepts Aircraft Test Bed, American Institute of Aeronautics and Astronautics, 2008 Region IV Student Paper Conference, Apr. 2008 (6 pages).
George, Justin, et al., Design of an Advanced Control Law and Sensors Concepts Aircraft Test Bed, American Institute of Aeronautics and Astronautics Region IV Student Paper Conferece, Oral Presentation Apr. 2008 (29 pages).
First Taxi Test of Texas A&M Pegasus UAV, available at: http://youtu.be/MZJ5HiQWO4w (Feb. 2012).

* cited by examiner

UN-MANNED AERIAL VEHICLE HAVING ADJUSTABLE WING MODULE, TAIL, AND LANDING GEAR

CROSS-REFERENCE TO RELATED APPLICATIONS

The present application claims priority to and incorporates by reference for any purpose the entire disclosure of U.S. Provisional Patent Application No. 61/760,292, filed Feb. 4, 2013.

BACKGROUND

Field of the Invention

The present application relates generally to aircraft and more particularly, but not by way of limitation, to unmanned aerial vehicles, featuring modular construction, that are suitable for a wide range of flight speeds and payload weights.

History of the Related Art

Various types of aircraft are important in a wide assortment of applications. Unmanned aerial vehicles, in particular, have become increasingly prevalent. Unmanned aerial vehicles, commonly known as "drones," are aircraft that operate without a human flight crew on board. The flight of an unmanned aerial vehicle is remotely controlled by a pilot on the ground. Such unmanned aerial vehicles serve a wide range of applications in the commercial, defense, intelligence, conservation, and research communities. Unmanned aerial vehicles often present fewer operational and safety challenges than conventional manned aircraft. For example, unmanned aerial vehicles may journey into environments that would be hazardous to a human flight crew. In addition, unmanned aerial vehicles may embark on missions of longer duration than could be accomplished with a human flight crew. Due to their assortment of potential applications, unmanned aerial vehicles may be designed with a wide array of sizes, payload capacities, and operational characteristics.

Of particular importance in the design of an unmanned aerial vehicle, is ensuring that the aircraft is suitable for safe, controllable, and stable flight over a range of applications. Such considerations impact the design of fuselage and wing components, control surfaces, payload areas, motor components, and landing gear. Low-speed flight conditions, particularly, present a number of design challenges. An unmanned aerial vehicle designed for low-speed flight must be lightweight with a high-power motor. In addition, the aircraft must feature a large-surface-area wing, which generates a high degree of lift. Further, the aircraft must have large control surfaces.

SUMMARY

The present application relates generally to aircraft and more particularly, but not by way of limitation, to unmanned aerial vehicles, featuring modular construction, that are suitable for a wide range of flight speeds and payload weights. In one aspect, the present invention relates to an aircraft. The aircraft includes a fuselage module for receiving a payload. The fuselage module includes a plurality of internal connections. The aircraft includes a wing module adjustably coupled to the fuselage module and a tail module coupled to the wing module. The wing module may be adjusted relative to the fuselage module to adjust a location of an aerodynamic center of the aircraft to maintain a pre-determined distance between the location of the aerodynamic center of the aircraft and a location of a center of gravity of the aircraft. Further, a main landing gear may be adjusted relative to the fuselage module to adjust the location of the aerodynamic center of the aircraft to maintain a pre-determined distance between the location of the aerodynamic center of the aircraft and the location of the center of gravity of the aircraft.

In another aspect, the present invention relates to a method of configuring an aircraft. The method includes positioning a payload within a fuselage module, determining a location of a center of gravity of the aircraft with the payload, and determined a desired location of a wing module relative to the fuselage module. The method further includes connecting the wing module to the fuselage module at the desired location and connecting a tail module to the wing module.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Various embodiments of the present invention will now be described more fully with reference to the accompanying drawings. The invention may, however, be embodied in many different forms and should not be construed as limited to the embodiments set forth herein.

Figure 1A:
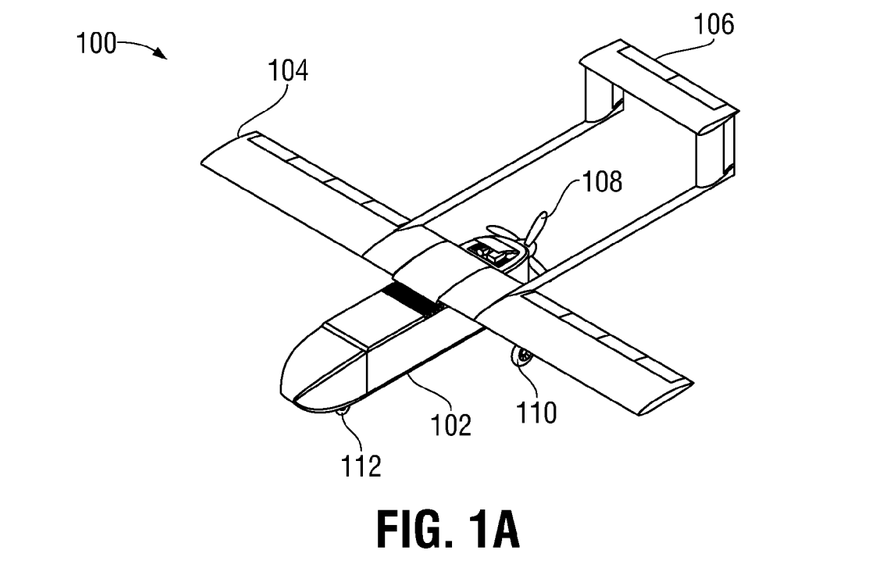
FIG. 1A is a perspective view of an aircraft according to an exemplary embodiment.
Figure 1B:
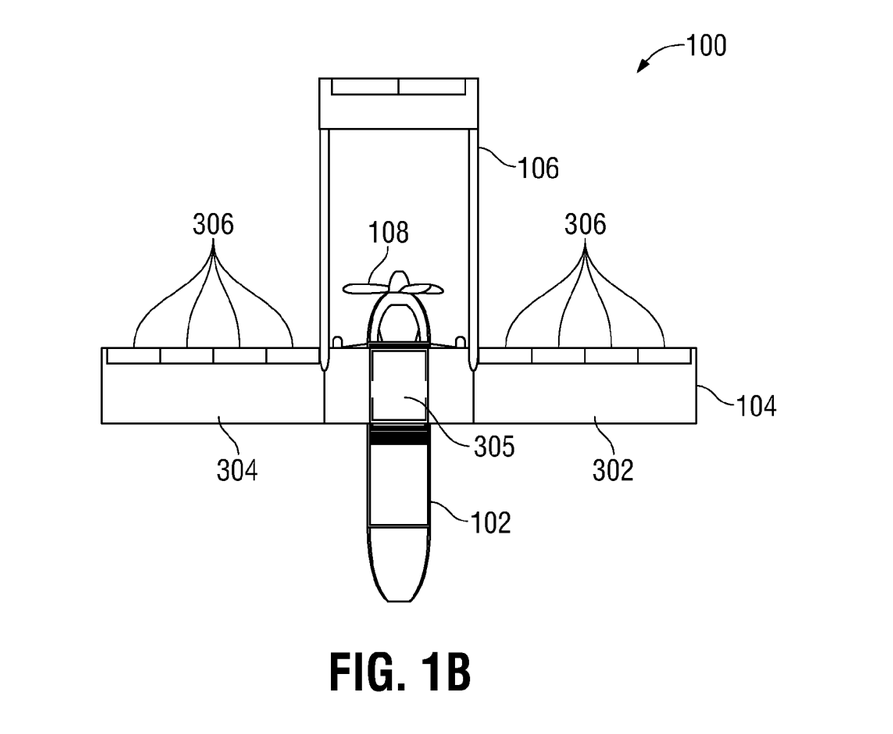
FIG. 1B is a top view of the aircraft of FIG. 1A according to an exemplary embodiment.
Figure 1C:
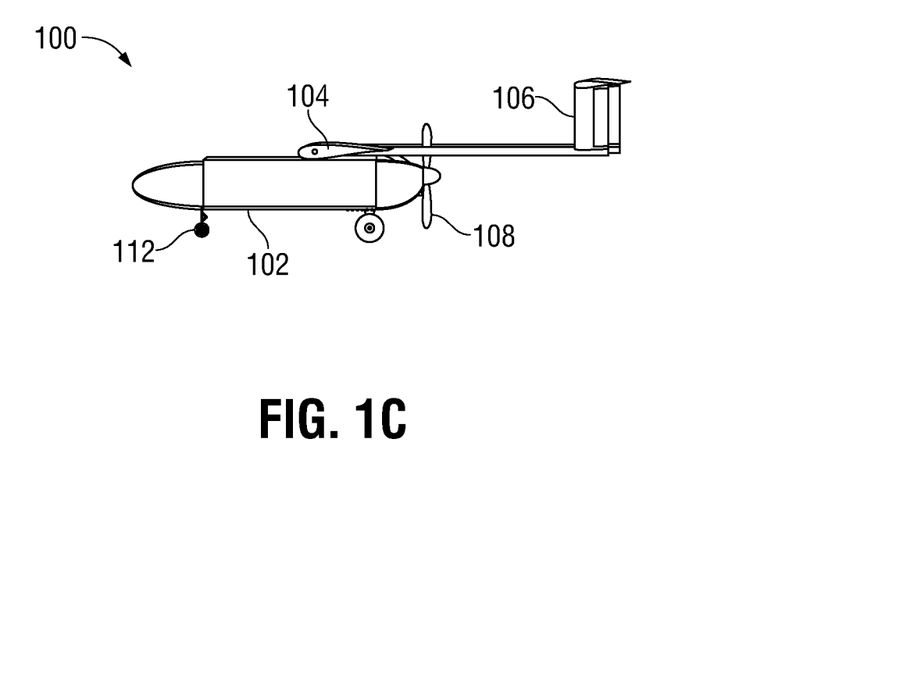
FIG. 1C is a side view of the aircraft of FIG. 1A according to an exemplary embodiment.
Figure 1D:
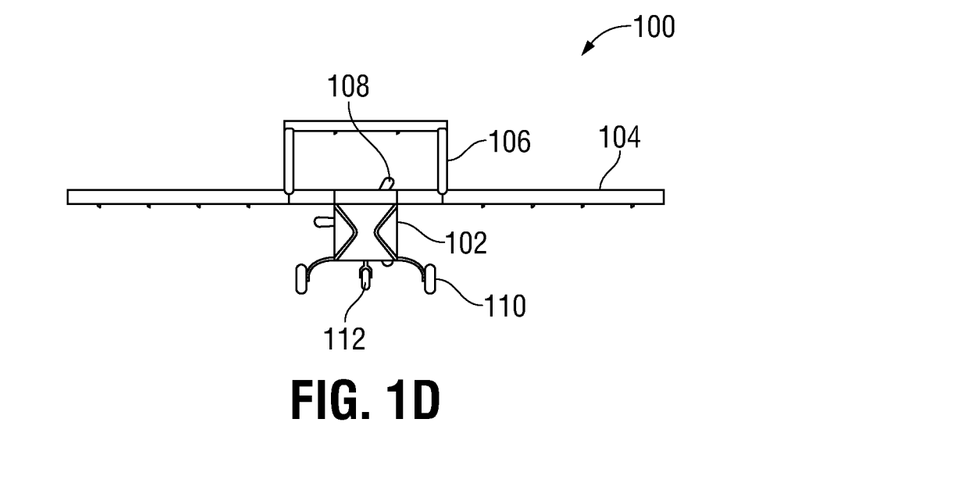
FIG. 1D is a front view of the aircraft of FIG. 1A according to an exemplary embodiment.

FIG. 1A is a perspective view of an aircraft 100. FIG. 1B is a top view of the aircraft 100. FIG. 1C is a side view of the aircraft 100 and FIG. 1D is a front view of the aircraft 100. Referring now to FIGS. 1A-1D, the aircraft 100 includes a fuselage module 102. A wing module 104 is coupled to an upper aspect of the fuselage module. A tail module 106 is coupled to the wing module 104. In a typical embodiment, the fuselage module 102, the wing module 104, and the tail module 106 are constructed from lightweight materials such as, for example, a wood skeleton surrounded by structural foam and a fiberglass skin. However, in other embodiments, different materials and construction may be utilized. A propeller 108 extends rearwardly from the fuselage module 102. Such a configuration is commonly known as a "pusher" configuration. In other embodiments, aircraft utilizing principles of the invention may include other propeller configurations. A main landing gear 110 and a nose landing gear 112 are coupled to an underside of the fuselage module 102.

Figure 2A:
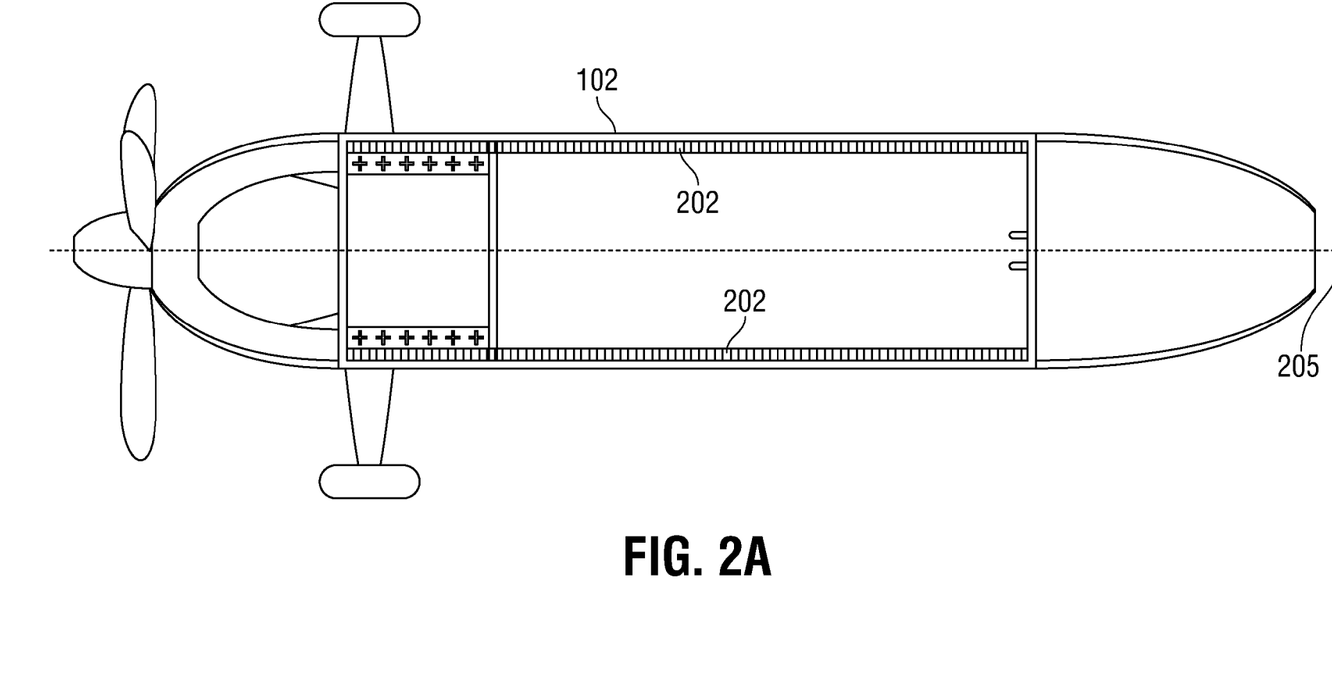
FIG. 2A is a top view of a fuselage module with a wing module removed according to an exemplary embodiment.

FIG. 2A is a top view of the fuselage module 102 with the wing module 104 removed. A pair of slot rails 202 are disposed along an interior floor of the fuselage module 102 generally parallel to an aircraft long axis 205. In a typical embodiment, the slot rails 202 are, for example, 80/20 T-slot rails. The pair of slot rails 202 provide a common mounting location for avionics racks and payloads. In a typical embodiment, a payload (not shown) is installed in a payload rack (not shown). The payload rack attaches to the slot rails 202 via, for example, vibration-absorbing sandwich mounts. Such an arrangement allows controlled placement of the payload or avionics, inside the fuselage module 102. In a typical embodiment, the pair of slot rails 202 accommodate, for example, up to six rack units of payload and avionics along the aircraft long axis 205. In a typical embodiment, the payload rack is, for example, a shallow-depth standard, Electronic Industries Alliance-310 ("EIA-310"), 19-inch rack chassis; however, in other embodiments, alternative configurations may be utilized such as, for example up to twelve rack units of half-width chassis along the narrow axis. A rack unit "U" is defined by EIA-310 as approximately 1.75 inches of space. Thus, three rack units, or "3U" would be approximately 5.25 inches of space. In a typical embodiment, the payload may be the size of, for example, a desktop computer.

Figure 2B:
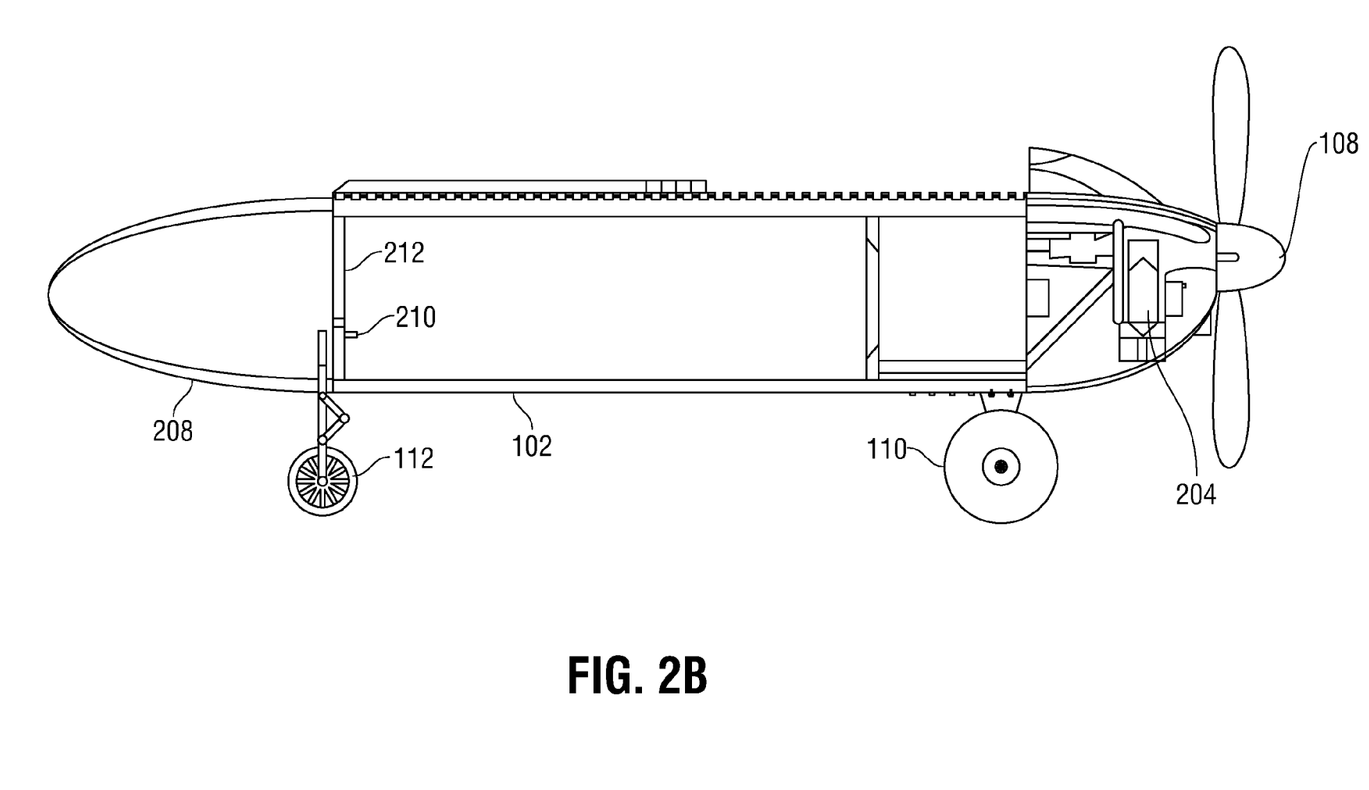
FIG. 2B is cross-sectional view of the fuselage module of FIG. 2A according to an exemplary embodiment.

FIG. 2B is a cross-sectional view of the fuselage module 102. Referring now to FIGS. 2A-2B, a drive motor 204 is disposed within a rear aspect of the fuselage module 102. The propeller 108 is coupled to the drive motor 204. In a typical embodiment, the drive motor 204 is of a power rating sufficient for a particular application. In particular, the drive motor 204 is of sufficient power to permit slow flight such as, for example, approximately 30 miles per hour or less. A nose region 208 of the fuselage module 102 is generally hollow. A hard point 210 is disposed on a forward bulkhead 212 for mounting payloads forward of the nose landing gear 112. In a typical embodiment, a connection point of the main landing gear 110 to the fuselage module 102 may be adjusted forward and aft along the aircraft long axis 205 relative to the fuselage module.

Figure 3A:
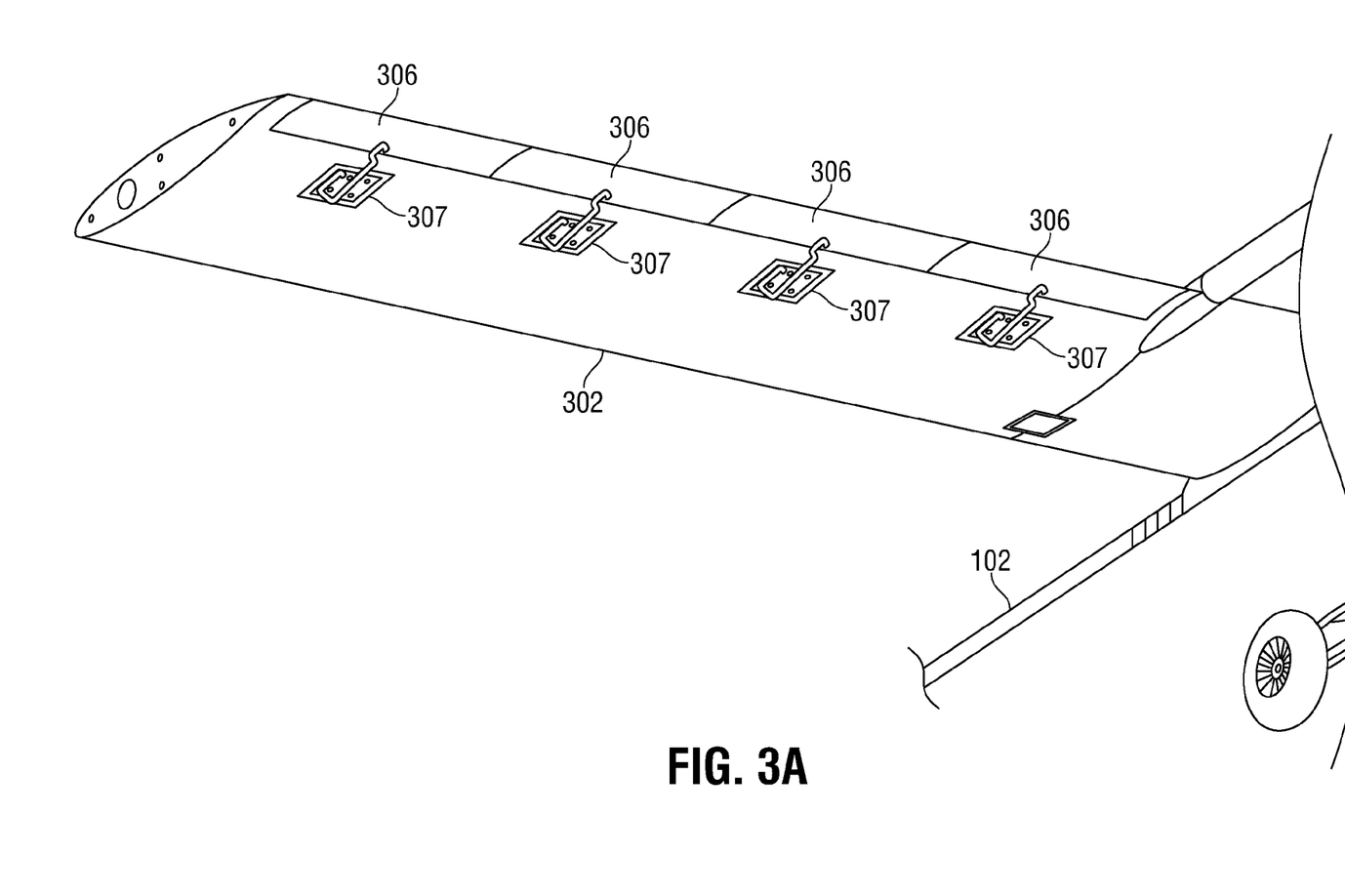
FIG. 3A is a detailed view of a wing module according to an exemplary embodiment.

FIG. 3A is a detailed view of an underside of the wing module 104. Referring to FIGS. 1B and 3A, the wing module 104 includes a first wing 302, a second wing 304, and an intermediate portion 305 (shown in FIG. 1B). The first wing 302 and the second wing 304 (shown in FIG. 1B) include a plurality of control surfaces 306. In the embodiment shown in FIGS. 1B and 3A, the first wing 302 and the second wing 304 include four control surfaces 306; however, in other embodiments, wing modules utilizing principles of the invention may include wings having any number of control surfaces such as, for example, two, three, or an integer number between four and ten. In a typical embodiment, each control surface of the plurality of control surfaces 306 may be configured on an individual basis as, for example, a flap, an aileron, or any combination thereof. Each control surface of the plurality of control surfaces 306 is individually actuated via independent electronic actuators 307. In a typical embodiment, the wing module 104 generates substantial lift relative to the weight of the aircraft 100. In a typical embodiment, the wing module 104 generates approximately 90% to approximately 100% of the lift required to sustain the aircraft 100 in flight. Such an arrangement facilitates flight of the aircraft 100 at very low speeds.

Still referring to FIGS. 1B and 3A, the plurality of control surfaces 306 imparts a high degree of fault tolerance to the aircraft 100. Fault tolerance refers to an ability of the aircraft 100 to maintain controlled flight in a damaged condition. Second, the plurality of control surfaces 306 imparts greater maneuverability to the aircraft 100. Such a feature is particularly advantageous during low-speed flight.

Figure 3B:
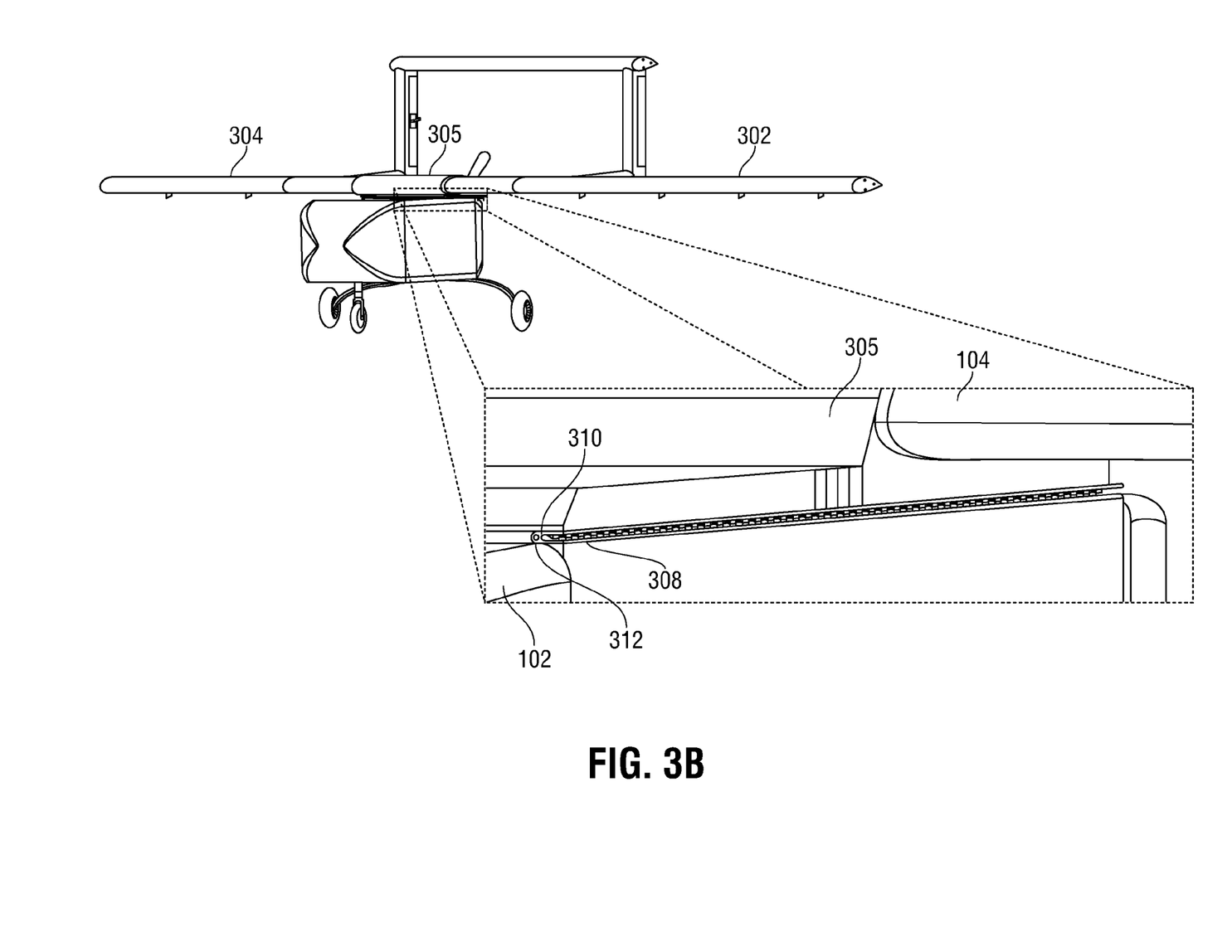
FIG. 3B is a detailed view of an attachment of the wing module of FIG. 3A to a fuselage module according to an exemplary embodiment.

FIG. 3B is an exploded view of an attachment point of the wing module 104 to the fuselage module 102. A first adjustable coupling 308 is disposed along a left side of an upper aspect of the fuselage module 102 and a second adjustable coupling 310 is disposed on an underside of the intermediate portion 305 of the wing module 104 to a left of the aircraft long axis 205 (shown in FIG. 2A). A third adjustable coupling (not shown) is disposed along a right side of the upper aspect of the fuselage module 102 and a fourth adjustable coupling (not shown) is disposed on the underside of the intermediate portion 305 of the wing module 104 to a right of the aircraft long axis 205. In a typical embodiment, the first adjustable coupling 308, the second adjustable coupling 310, the third adjustable coupling, and the fourth adjustable coupling are, for example, a structural hinge such as, for example, a piano hinge.

Still referring to FIG. 3B, during operation, the first adjustable coupling 308 is intermeshed with the second adjustable coupling 310. A pin 312 is inserted through the first adjustable coupling 308 and the second adjustable coupling 310 thereby securing the first adjustable coupling 308 to the second adjustable coupling 310. In similar fashion, the third adjustable coupling is intermeshed with the fourth adjustable coupling. A second pin (not shown) is inserted through the third adjustable coupling and the fourth adjustable coupling thereby securing the third adjustable coupling to the fourth adjustable coupling.

Figure 2C:
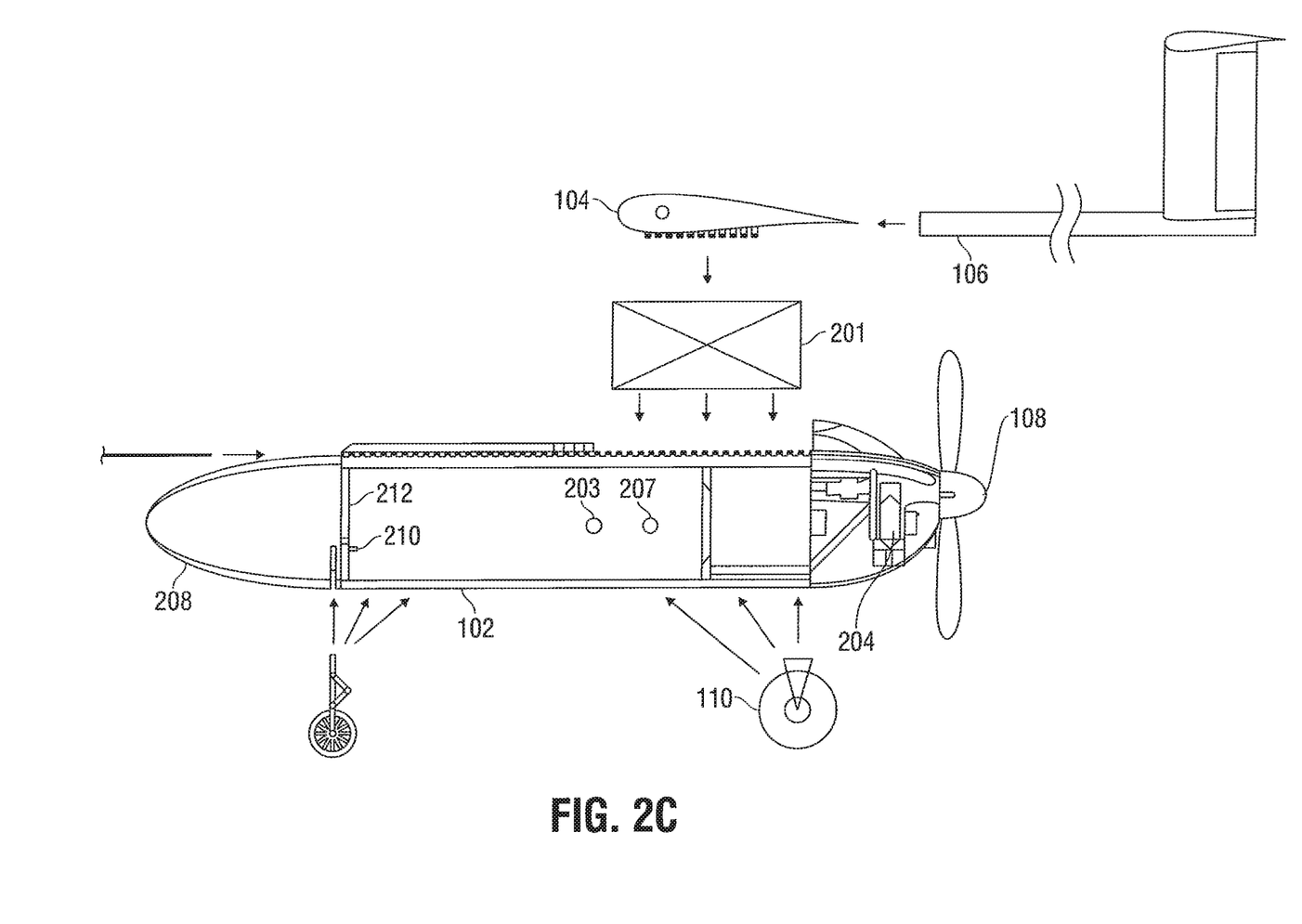
FIG. 2C is an exploded cross-sectional view of the fuselage module of FIG. 2A according to an exemplary embodiment.

FIG. 2C is an exploded cross-sectional view of the fuselage module 102. Referring now to FIGS. 2B-2C and 3B, engagement of the first adjustable coupling 308 with the second adjustable coupling 310 and engagement of the third adjustable coupling with the fourth adjustable coupling adjustably secures the wing module 104 to the fuselage module 102. Such an arrangement allows a position of the wing module 104 to be adjusted along the aircraft long axis 205 relative to the fuselage module 102. Aerodynamic stability requires that a pre-determined ideal distance be maintained between a center of gravity 203 of the aircraft 100 and an aerodynamic center 207 of the aircraft 100. Loading conditions of the aircraft 100, particularly weight distribution of the payload 201, may cause the center of gravity of the aircraft 100 to move forward or aft along the aircraft long axis 205. Adjustability of the wing module 104 and the main landing gear 110 allows the aerodynamic center of the aircraft to be moved to maintain the predetermined ideal distance between the center of gravity of the aircraft 100 and the aerodynamic center of the aircraft 100.

Still referring to FIGS. 2B and 3B, for example, in certain aircraft-loading conditions, the center of gravity of the aircraft 100 may move forward along the aircraft long axis 205. In such conditions, it may be desirable to move the wing module 104 forward along the aircraft long axis 205 relative to the fuselage module 102. To adjust a position of the wing module 104 relative to the fuselage module 102, the second adjustable coupling 310 is moved forward in a step-wise fashion relative to the first adjustable coupling 308. The fourth adjustable coupling is similarly moved relative to the third adjustable coupling. Similar adjustments may be utilized to move the wing module 104 aft along the aircraft long axis 205 relative to the fuselage module 102.

In similar fashion, certain aircraft-loading conditions may require that a location of the main landing gear 110 relative to the fuselage module 102 be adjusted to maintain the pre-determined ideal distance between the center of gravity of the aircraft 100 and the aerodynamic center of the aircraft 100. In such conditions, the main landing gear 110 is de-coupled from the fuselage module 102 and re-attached to the fuselage module 102 at a desired location.

Figure 4A:
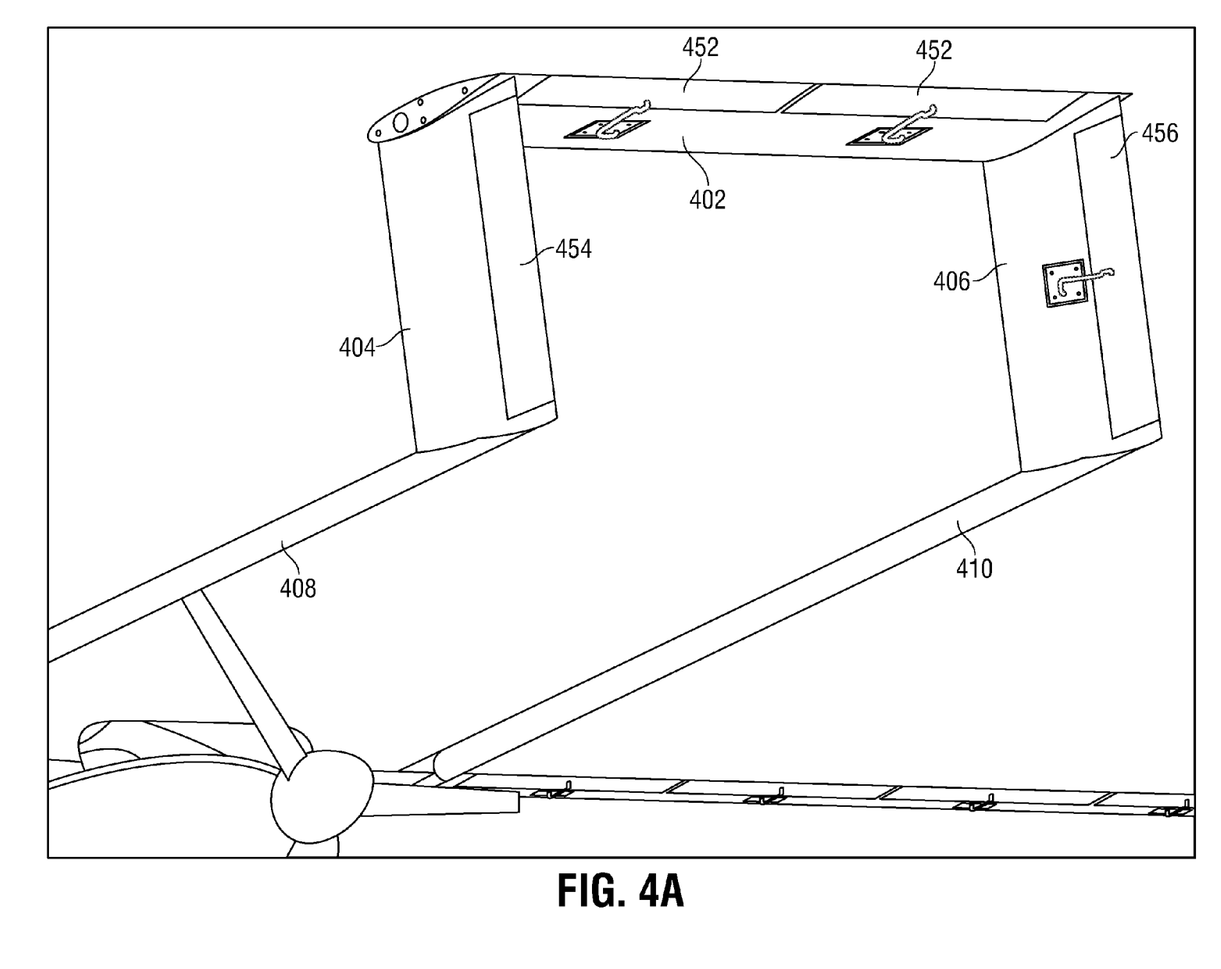
FIG. 4A is a detailed view of a tail module according to an exemplary embodiment.

FIG. 4A is a detailed view of the tail module 106. The tail module 106 includes a horizontal stabilizer 402. A first vertical stabilizer 404 and a second vertical stabilizer 406 are coupled to the horizontal stabilizer 402. A first boom 408 is coupled to the first vertical stabilizer 404 and a second boom 410 is coupled to the second vertical stabilizer 406. The horizontal stabilizer 402 includes elevators 452. In the embodiment shown in FIG. 4A, the horizontal stabilizer includes two elevators 452; however, in other embodiments horizontal stabilizers utilizing principles of the invention may include any number of elevators. In a typical embodiment, the elevators 452 are independently actuated. A first rudder 454 is formed on the first vertical stabilizer 404 and a second rudder 456 is formed on the second vertical stabilizer 406. In a typical embodiment, the first rudder 454 and the second rudder 456 are independently actuated.

Figure 4B:
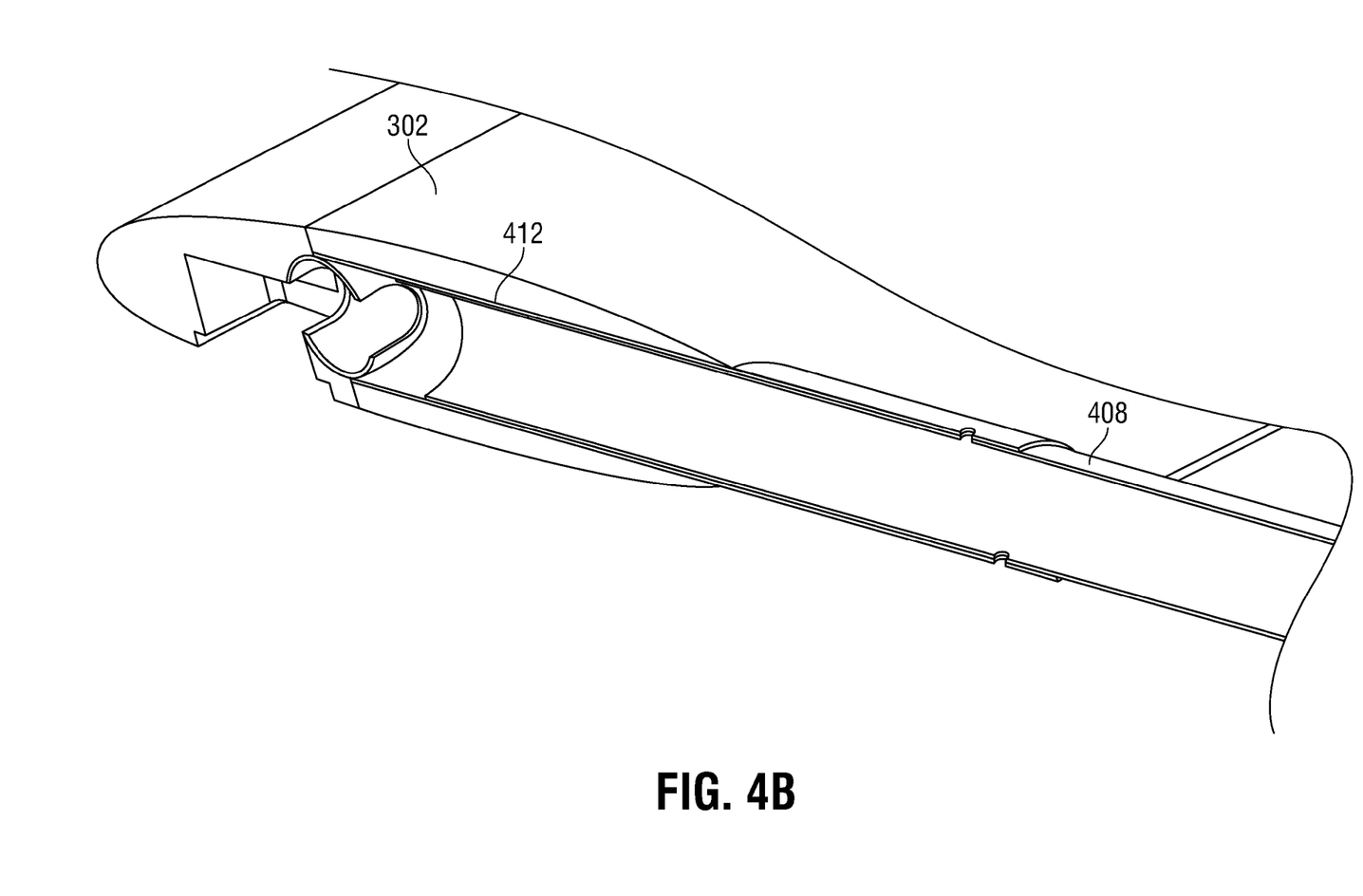
FIG. 4B is a cross-sectional view of an attachment of the tail module of FIG. 4A to a wing module according to an exemplary embodiment.

FIG. 4B is a cross-sectional view of an attachment of the tail module 106 to the wing module 104. A first aperture 412 is disposed through the first wing 302 and a second aperture (not shown) is disposed through the second wing 304 generally parallel to the aircraft long axis 205 (shown in FIG. 2A). The first boom 408 is inserted into, and secured within, the first aperture 412 and the second boom 410 is inserted into, and secured within, the second aperture. The first boom 408 may be secured within the first aperture 412 via any appropriate coupling such as, for example, threads, screws, bolts, rivets, and the like. The second boom 410 is similarly secured within the second aperture. In various embodiments, a position of the tail module 106 is adjustable along the aircraft long axis 205 relative to the fuselage module 102. Adjustment of the position of the tail module 106 may be accomplished by, for example, a plurality of spring-loaded buttons present on the first boom 408 and the second boom 410. In other embodiments, the first boom 408 and the second boom 410 may be replaceable with components of different lengths. In other embodiments, aircraft utilizing principles of the invention may include a tail module that connects to the fuselage module.

Referring to FIGS. 1A and 4B, in other embodiments, at least one of the horizontal stabilizer 402, the first vertical stabilizer 404, the second vertical stabilizer 406, the first boom 408, and the second boom 410 may be omitted. In such embodiments, the aircraft 100 may be arranged in a "flying wing" configuration. In other embodiments, canards (not shown) may project from a forward aspect of the fuselage module 102. In still other embodiments, aircraft utilizing principles of the invention may be arranged in a rotor-wing configuration.

Figure 5:
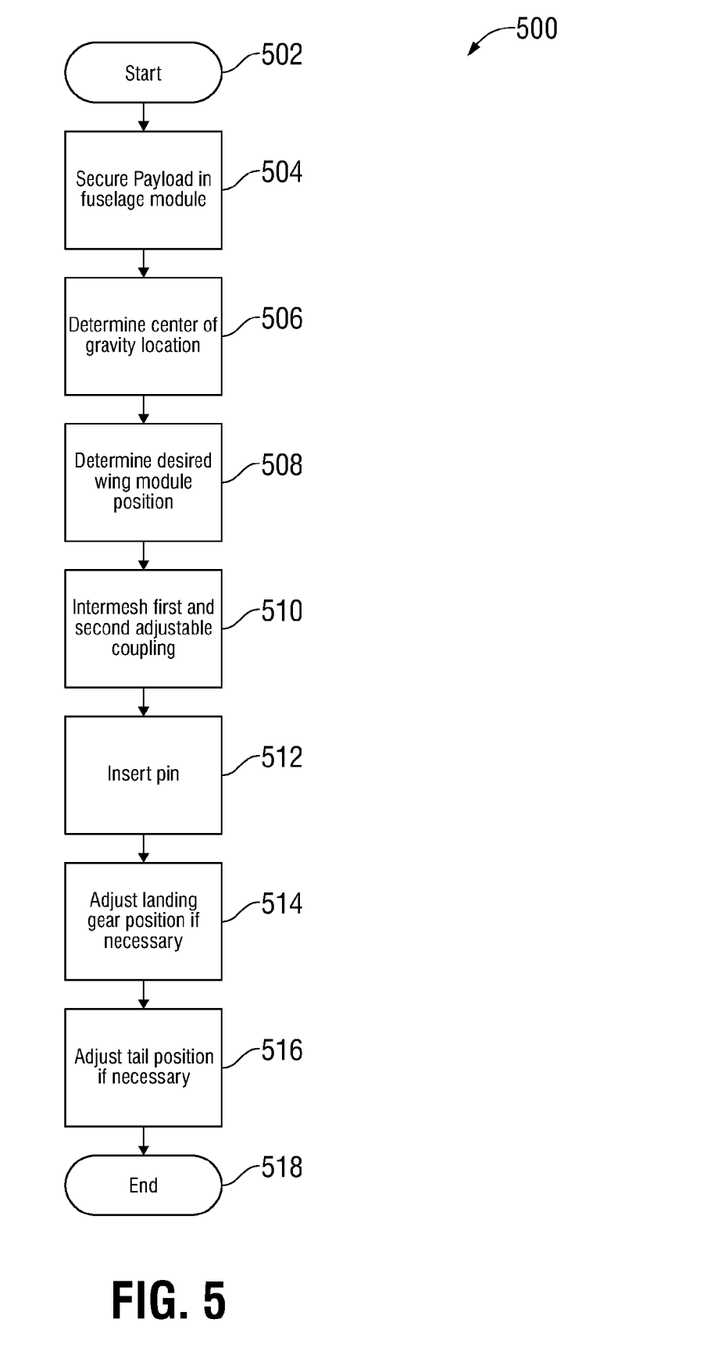
FIG. 5 is a flow diagram of a process for configuring an aircraft to a payload according to an exemplary embodiment.

FIG. 5 is a flow diagram of a process 500 for configuring the aircraft 100 to a particular payload. The process 500 begins at step 502. At step 504, a payload is secured within the fuselage module 102. At step 506, a center of gravity of the aircraft 100 is determined. At step 508, a desired position of the wing module 104 is determined responsive to the location of the center of gravity of the aircraft 100. At step 510, the first adjustable coupling 308 is intermeshed with the second adjustable coupling 310 and the third adjustable coupling is intermeshed with the fourth adjustable coupling in such a way as to place the wing module 104 in the desired position relative to the fuselage module 102. At step 512, the pin 512 is inserted through the first adjustable coupling 308 and the second adjustable coupling 310. The second pin is inserted through the third adjustable coupling and the fourth adjustable coupling. At step 514, if needed, a position of the main landing gear 110 is adjusted. At step 516, if needed, a position of the tail module 106 is adjusted. The process 500 ends at step 518.

The aircraft 100, as shown and described herein, presents several advantages that will be apparent to those skilled in the art. First, the aircraft 100 is of a modular construction. Such modular construction allows the aircraft 100 to be specifically configured for a particular payload. Second, the aircraft 100 is capable of very low-speed flight. Such low-speed flight is facilitated by the fuselage module 102, the wing module 104, and the tail module 106 being constructed of lightweight components. Low-speed flight is further facilitated by the wing module 104 generating substantial width relative to the overall weight of the aircraft 100 and by the plurality of control surfaces 306 having a large surface area relative to an overall surface area of the wing module 104. In a typical embodiment, the control surfaces 306 are approximately 10% of the total surface area of the left wing 302 and the right wing 304. The control surfaces 306 do not run an entire trailing edge of the left wing 302 and the right wing 304.

Although various embodiments of the method and system of the present invention have been illustrated in the accompanying Drawings and described in the foregoing Specification, it will be understood that the invention is not limited to the embodiments disclosed, but is capable of numerous rearrangements, modifications, and substitutions without departing from the spirit and scope of the invention as set forth herein. It is intended that the Specification and examples be considered as illustrative only.

What is claimed is:

1. An aircraft comprising:
   a fuselage module for receiving a payload, the fuselage module comprising a plurality of internal connections;
   a main landing gear adjustably coupled to the fuselage module;
   a first adjustable coupling disposed on an upper aspect of the fuselage module;
   a wing module adjustably coupled to the fuselage module;
   a second adjustable coupling disposed on a lower aspect of the wing module;
   a tail module adjustably coupled to the wing module;
   wherein the first adjustable coupling is selectively intermeshed with the second adjustable coupling configured to adjust the wing module relative to the fuselage module at discrete step-wise intervals to maintain a pre-determined distance between a location of an aerodynamic center of the aircraft and a location of a center of gravity of the aircraft; and
   wherein the main landing gear is configured to decouple from the fuselage module and to recouple to the fuselage module at a desired location in order to maintain the pre-determined distance between the location of the aerodynamic center of the aircraft and the location of the center of gravity of the aircraft.

2. The aircraft of claim 1, comprising a nose landing gear adjustably coupled to the fuselage module.

3. The aircraft of claim 1, comprising a drive motor disposed within a rear aspect of the fuselage module.

4. The aircraft of claim 1, comprising a pin securing the first adjustable coupling and the second adjustable coupling.

5. The aircraft of claim 1, wherein the tail module comprises a first boom and a second boom.

6. The aircraft of claim 5, wherein the wing module comprises a first aperture and a second aperture.

7. The aircraft of claim 6, wherein the first boom is inserted into the first aperture and the second boom is inserted into the second aperture.

8. The aircraft of claim 5, wherein the tail module is adjustable forward and aft relative to the wing module.

9. The aircraft of claim 1, wherein the plurality of internal connections comprise a plurality of slot rails disposed generally parallel to an aircraft long axis.

10. The aircraft of claim 9, wherein the plurality of slot rails are T-slot rails.

11. A method of configuring an aircraft, the method comprising:
 positioning a payload within a fuselage module, the fuselage module comprising a first adjustable coupling disposed on an upper surface and a main landing gear coupled to the fuselage module;
 determining a desired distance between a center of gravity of the aircraft and an aerodynamic center of the aircraft;
 determining a first desired location of a wing module relative to the fuselage module so as to maintain the desired distance, the wing module comprising a second adjustable coupling disposed on a lower aspect thereof, wherein the first adjustable coupling and the second adjustable coupling are configured to selectively intermesh with each other and configured to adjust the wing module relative to the fuselage module at discrete step-wise intervals;
 selectively intermeshing the first adjustable coupling with the second adjustable coupling so as to connect the wing module to the fuselage module at the first desired location;
 decoupling the main landing gear from the fuselage module;
 recoupling the main landing gear to the fuselage module at a second desired location so as to maintain the desired distance; and
 connecting a tail module to the wing module.

12. The method of claim 11, wherein the connecting the wing module comprises inserting a pin through the first adjustable coupling and the second adjustable coupling.

13. The method of claim 11, wherein the connecting the tail module comprises inserting a first boom into a first aperture located on the wing module and inserting a second boom into a second aperture located on the wing module.

14. The method of claim 11, wherein the positioning the payload within the fuselage module comprises securing the payload to a plurality of slot rails.

15. A method of configuring an aircraft, the method comprising:
 selecting a desired location of a center of gravity of the aircraft and a desired distance between an aerodynamic center of the aircraft and the desired location of the center of gravity of the aircraft;
 positioning a payload within a fuselage module so as to maintain the desired location of the center of gravity of the aircraft, the fuselage module comprising a first adjustable coupling disposed on an upper surface thereof and a main landing gear coupled to the fuselage module;
 decoupling the main landing gear from the fuselage module;
 recoupling the main landing gear to the fuselage module at a first desired location so as to maintain the desired location of the center of gravity of the aircraft;
 determining a second desired location of a wing module relative to the fuselage module so as to maintain the desired location of the center of gravity of the aircraft and the desired distance between the location of the aerodynamic center of the aircraft and the desired location of the center of gravity of the aircraft, the wing module comprising a second adjustable coupling disposed on a lower aspect thereof, wherein the first adjustable coupling and the second adjustable coupling are configured to selectively intermesh with each other and configured to adjust the wing module relative to the fuselage module at discrete step-wise intervals;
 selectively intermeshing the first adjustable coupling with the second adjustable coupling so as to connect the wing module to the fuselage module at the second desired location;
 determining a third desired location of a tail module relative to the wing module so as to maintain the desired distance between the location of the aerodynamic center of the aircraft and the desired location of the center of gravity of the aircraft; and
 connecting the tail module to the wing module at the third desired location.

* * * * *